April 12, 1932.  E. BRUMM  1,853,758
WINDSHIELD WIPER MOTOR
Filed July 8, 1930  3 Sheets-Sheet 3
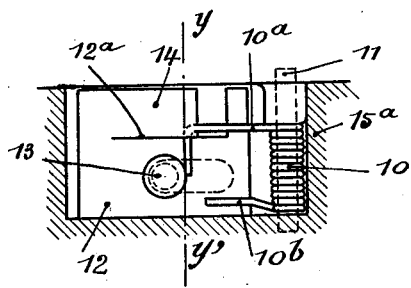
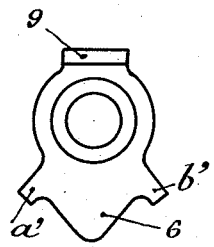
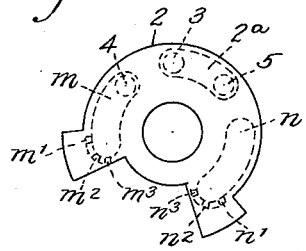
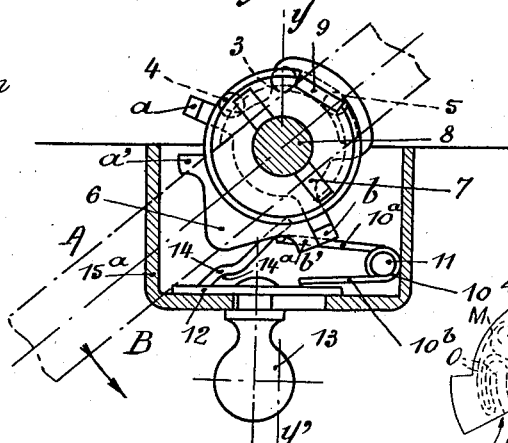
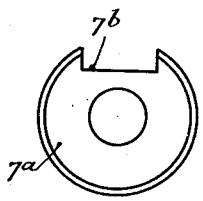
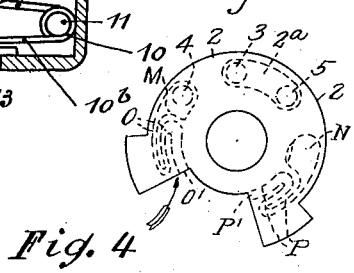
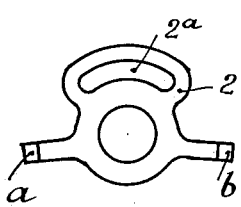
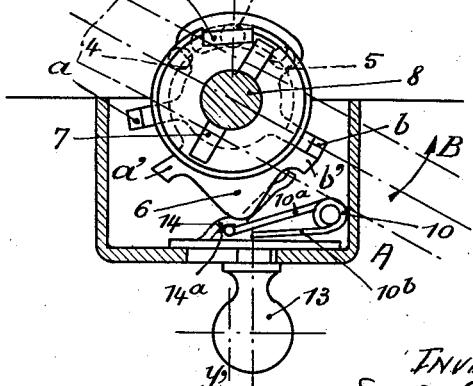

Patented Apr. 12, 1932

1,853,758

UNITED STATES PATENT OFFICE

EMILE BRUMM, OF LYON, FRANCE

WINDSHIELD WIPER MOTOR

Application filed July 8, 1930, Serial No. 466,555, and in France July 12, 1929.

My invention has for its object a windshield-wiper engine which is adapted to work under the action of the suction produced by the engine of the vehicle on which is mounted the windshield wiper. In this windshield-wiper engine, the distribution is effected by means of a sector-shaped slide-valve provided with a semicircular groove, and the sudden angular displacement of which in one direction or in the other is obtained by means of a snap action mechanism comprising a cam or boss. Said engine is characterized by the following features:

(a) The cam is directly driven by a spring which imparts to it the necessary impulse for producing at the end of the stroke of the piston the sudden angular displacement of the slide valve. This direct driving action reduces to a minimum the number of moving pieces, their friction or resistance to motion and accordingly ensures the maximum of sensibility and of efficiency of the engine of the windshield-wiper.

(b) The spring is adapted to be in torsion and consists, for instance of a coil spring, one end of which is fixed while the other is free and is in direct contact with the cam. A spring of this kind presents a lesser resistance to the passing of the dead point than the spring working in compression that is usually employed.

(c) The stoppage of the windshield-wiper engine is effected through a movable plate operated from the outside and interposed between the cam and the free end of the spring so as to prevent it from acting on the cam. In this manner one of the faces of the piston of the engines remains in communication with the vacuum or depression of the motor in the position that said piston has at the end of its travel. In other words, by putting out of operation the tripping device, the slide valve is prevented from reversing, at the end of the stroke of the piston, the application of the vacuum or suction.

In the apparatus of the kind referred to in the present invention, the external air is suddenly drawn in through the orifice that is uncovered by the slide valve. A characteristic whistling noise results therefrom owing to the eddies and variations of suction which take place inside the apparatus.

The present invention makes it possible to avoid this disadvantage by braking the ingress of external air into the slide valve of the windshield-wiper. For this purpose the air inlet orifices are placed into communication either with chambers in which the air expands gradually, or with conduits provided with suitable baffles.

A preferred embodiment of my invention will be described with reference to the appended drawings in which:

Fig. 3 is a front view of the slide-valve and of the tripping device, the apparatus being in operation; in this figure the casing has been sectioned so as to show the mechanism;

Fig. 4 is a view similar to Fig. 3, the apparatus being at rest;

Fig. 5 is a plan view of a detail of the apparatus, the slide valve being removed from its casing;

Figs. 6, 7 and 8 are detail views showing respectively the slide-valve, the cam and a cup-shaped piece adapted to cooperate with the cam;

Fig. 9 shows a slide-valve provided with chambers for the gradual expansion of the air, in its two extreme angular positions;

Fig. 10 is another embodiment of the device of Fig. 9.

Figure 2:
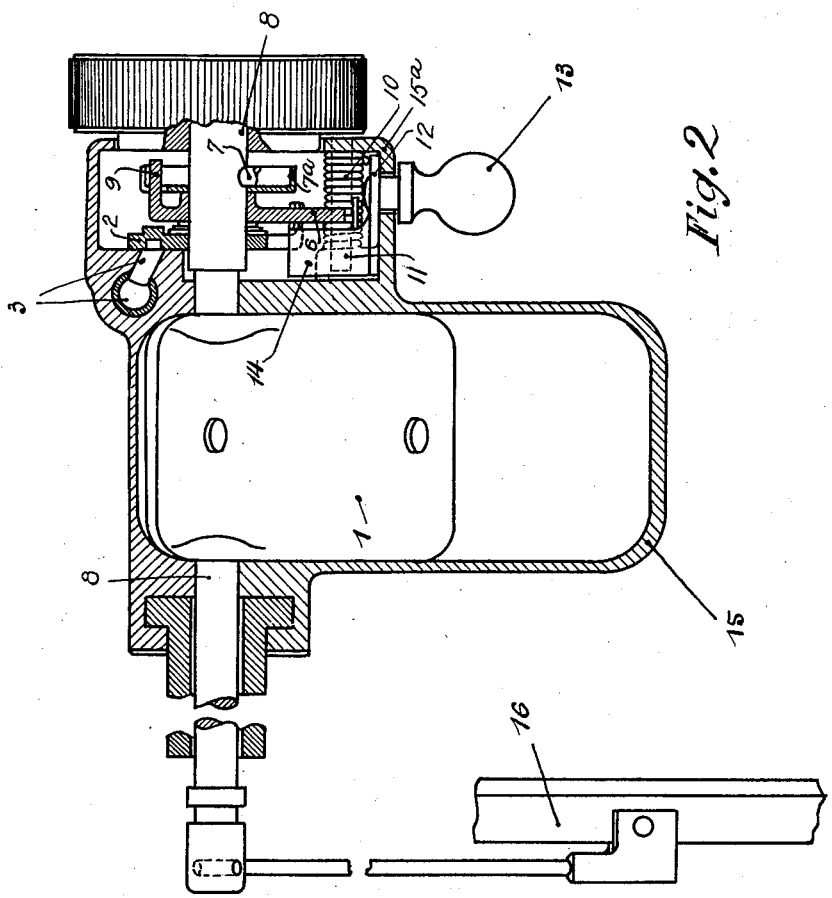
Fig. 2 is a section on a larger scale on the line 2—2 of Fig. 1, the apparatus being out of operation.

As shown in the drawings, the piston 1 can take a reciprocating swinging motion in a sector-shaped casing 15 (Fig. 2), and is adapted to drive a shaft 3 on which it is keyed. Said shaft carries at one of its ends the wiper 16 which serves to wipe the windshield, and at the other end the distributing system inclosed in a casing 15a. The suction of the engine is placed into communication, through port 3 (Figs. 2 and 3), with either one or the other face of piston 1, by means of the slide valve 2 which is given a reciprocating rotary motion about shaft 8. Said slide-valve, which is shown in detail in Fig. 6, consists of a sector provided with a semicircular groove 2a and with two lugs a and b. The groove 2a connects said port 3 at one time with face B of the piston through port 5 (case of Fig. 3), while face A is in direct communication with the atmosphere through port 4 which is uncovered, at another time with face A, while port 5 is uncovered in its turn. These changes occur when piston 1, at the end of its stroke, rotates cam 6 (shown in detail in Fig. 7) through the action of a pin 7, integral with shaft 8, and which comes into contact with the catch 9 of cam 6. Said cam 6 is pushed on either side of its position of equilibrium by a spring 10 mounted on an axis 11 fixed in the casing 15a of the apparatus and the upper free end of which 10a exerts pressure against the pointed end of cam 6, whereas the lower end 10b bears on a plate 12 which rests upon the bottom of the casing 15a. Pin 7 is kept in position on shaft 8 by means of a cup-shaped member 7a provided with a notch 7b, for the passage of the catch 9 of cam 6. This member 7a is shown in detail in Fig. 8.

It will be understood that as soon as cam 6 has passed beyond its position of equilibrium, spring 10, which was compressed by said cam, springs back in such manner that its free end suddenly pushes the cam to the end of its stroke by exerting its action on the side of said cam. The impulse that has thus been given to the cam is transmitted to the slide-valve 2 through one of the lugs a', b' of the cam which comes into contact with the corresponding lug a or b of the slide valve 2, so that said slide valve is suddenly rotated and places port 3 into communication with port 4, thus reversing the application of vacuum or suction.

It should be noticed that spring 10 acts not only as a driving member but also as a stop, after it has slid along one side of the cam it is stopped behind one of the lugs a' or b' of said cam, which limits both the expansion of the spring and the angular displacement of the cam.

In order to stop the windshield-wiper and to keep the wiper in one of the extreme positions, at the limit of the field of vision of the passenger or driver, for instance in the position shown in Fig. 4, it is sufficient to prevent the spring from springing back, and therefore, from imparting an impulse to the slide-valve.

For this purpose, the effort that is transmitted to cam 6 through spring 10 can be offset from the outside of the apparatus, by operating a knob 13 attached to a plate 12 capable of being displaced toward the right or the left and provided with a suitably shaped tongue 14. When said tongue is pushed toward the right (case of Fig. 4), it compels the end 10a of spring 10 to engage a notch 14a so that it is kept out of contact with cam 6 until the reverse operation, i. e. the displacement of knob 13 toward the left, releases said spring. This tongue 14 is obtained in a simple way by cutting plate 12 along the line 12a and by bending the cut part upward, after which said part is suitably shaped so as to present the notch 14a shown in Figs. 3 and 4.

In the position of Fig. 4, the cam does not receive any more the impulse of spring 10 when its axis has passed beyond the vertical, (which takes place at the end of the stroke of the piston toward the right). Therefore it cannot drive slide-valve 2 into the position which produces the reversing of distribution. Port 3 thus remains in communication through port 5 with the face B of the piston upon which the suction continues to act up to the time of the starting operation (displacement of knob 13 toward the left) which releases spring 10 and enables it to act on cam 6 and to produce the displacement of slide-valve 2, which had been prevented up to that time.

Figure 1:
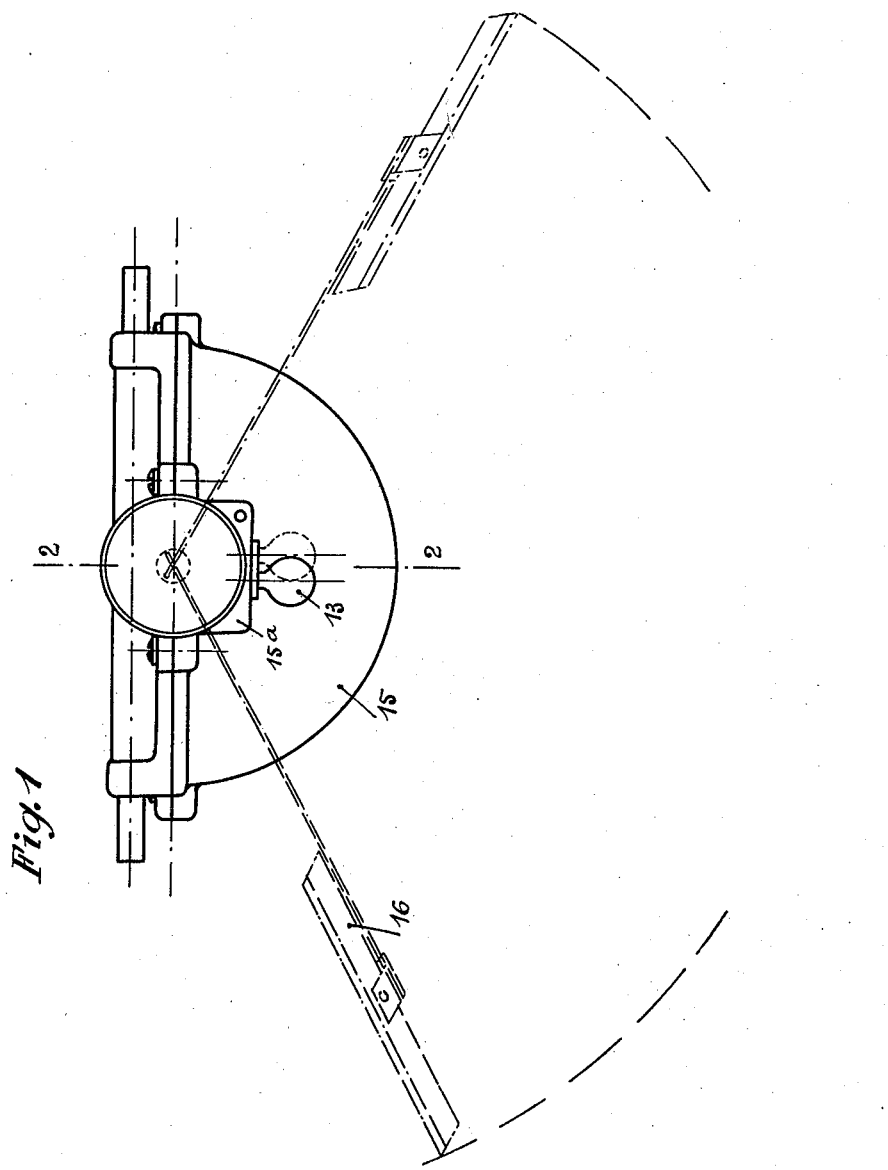
Fig. 1 is a front view of the windshield-wiper.

As this distributing device operates in an entirely symmetrical manner, it is obvious that the wiper can be stopped at will on the right or on the left (the extreme positions are shown in Fig. 1), according as the stopping operation will be effected while the wiper is moving in one direction or in the other. As the suction of the engine acts as long as the source of vacuum is in operation, it will keep the wiper in one of the extreme positons, on the right or on the left (Fig. 4) that is to say at the limit of the field of vision of the driver or of the passenger.

The improvement shown in Figs. 12 to 14 has for its purpose the elimination of the whistling noises resulting from the ingress of air into the slide-valve. The slide-valve 2 of the windshield-wiper then comprises, according to my invention, two grooves or hollows acting as chambers $m$ and $n$ for the gradual expansion of air, which alternatively cover the conduits 4 and 5 through which air is admitted in the casing of the apparatus. These chambers $m$ and $n$ are in communication with the atmosphere through several small passages $m^1, m^2, m^3$, and $n^1, n^2, n^3$. The sum of the sections of these passages may be smaller than or equal to that of conduit 4 or 5, and the rate of ingress of the air is thus decreased in such manner that the windshield-wiper may be considered as working noiselessly.

In another embodiment shown in Fig. 15, chambers $m$ and $n$ are in communication with the atmosphere through conduits or grooves $o, p$ which are suitably bent so as to form baffles across the path of air. The section of the openings $o^1 p^1$ of the conduits, and the section of said conduits are smaller than or equal to that of conduits 4 or 5.

The same result is thus obtained as in the preceding embodiment, the baffle arrangement having also for its result a reduction of the rate of ingress of air in chambers $m$ and $n$.

It is obvious that this improvement makes it possible to obtain the maximum frequency of the alternating motion of the windshield-wiper by regulating the dimensions of passages $m^1$, $m^2$, $m^3$, $n^1$, $n^2$, $n^3$ or, in the other embodiment, the section of opening $o^1$, $p^1$ and of conduits $o$, $p$, while leaving conduits 4 and 5 of sufficient section for avoiding losses of pressure which would be detrimental to the good operation of the mechanism. Besides, the mere reduction of the sections of conduits 4 and 5 would produce an increase of the noise, since the velocity of the air would be different before its arrival to conduits 4 and 5, and in said conduits.

While I have in the above description endeavored to disclose what I believe to be an efficient and practical embodiment of my invention, it is to be understood that the invention is not limited by the specific details as shown, but that it is subject to many and all structural variations which may express the invention and at the same time come within the scope of the appended claims. For instance, the baffles could have a form different from that shown in Fig. 11. The number of openings could also be modified.

What I claim is:—

1. A windshield wiper motor of the type to be operated by a source of suction, comprising in combination a casing, a shaft axially disposed in said casing, a piston keyed to said shaft and adapted to receive a reciprocating rotary motion in said casing, a valve system for operatively connecting said source of suction to opposite sides of the piston alternately, a snap action mechanism for operating said valve system, automatic controlling means operatively connected to the motor shaft for causing said snap action mechanism to work when the piston is near the end of its stroke in either direction, and manually operated means for placing said snap action mechanism into an inoperative position.

2. A windshield wiper motor of the type adapted to be operated by a source of suction, comprising in combination a casing, a shaft axially disposed with respect to said casing and carrying at one end of the windshield wiper a piston keyed to said shaft and adapted to receive a reciprocating rotary motion within said casing, a slide valve rotatably mounted on said shaft for operatively connecting said source of suction to opposite sides of the piston alternately, a cam rotatably mounted on said shaft, adapted to cooperate with said slide valve, a spring adapted to engage said cam, a pin projecting radially from said shaft and adapted to engage said cam for rotating it so as to compress said spring and then release it, whereby said spring imparts a sudden impulse to the cam, means for keeping the spring out of contact with the cam and thus preventing its action on said cam, whereby the source of suction remains in communication with the same side of the piston.

3. A windshield-wiper of the type adapted to be operated by a source of suction, comprising in combination a sector-shaped casing, a shaft axially disposed with respect to said casing and carrying at one end the windshield wiper, a piston keyed to said shaft and adapted to receive a reciprocating rotary motion within said casing, a slide-valve rotatably mounted on said shaft for operatively connecting the source of suction to opposite sides of the piston alternately, two lugs on said slide-valve, a cam rotatably mounted on said shaft, two lugs on said cam adapted to cooperate with the lugs on the slide valve, a spring adapted to bear on the cam, a pin projecting radially from the shaft and adapted to engage said cam for rotating the cam so as to compress said spring and then release it, whereby said spring imparts a sudden impulse to the cam, slidable means for keeping the spring out of contact with the cam and thus preventing its action on said cam, whereby the source of suction remains in communication with the same side of the piston.

4. A windshield-wiper motor of the type adapted to be operated by a source of suction, comprising in combination, a sector-shaped casing, a shaft axially disposed with respect to said casing and carrying at one end the windshield-wiper, a piston keyed on said shaft and adapted to receive a reciprocating rotary motion within said casing, a slide-valve rotatably mounted on said shaft for operatively connecting said source of suction to opposite sides of the piston alternately, a cam rotatably mounted on said shaft, adapted to cooperate with the lugs on the slide valve, a casing adapted to inclose the slide-valve and the cam, a coil spring mounted in this casing with its axis parallel to the shaft, the two ends of said spring projecting radially so that the lower end is in contact with the bottom of the casing and the upper end bears against the cam, a catch on said cam, a pin projecting radially from the shaft and adapted to engage said cam for rotating the cam so as to compress said spring and then release it, whereby said spring imparts a sudden impulse to the cam, a plate slidably mounted on the bottom of the last mentioned casing, a knob fixed on said plate and projecting outside of the casing for actuating said plate, a tongue on said plate adapted to engage the upper end of the spring so as to keep it out of contact with the cam, and thus prevent its action on the cam, whereby the source of suction remains in communication with the same side of the piston.

5. A windshield-wiper motor of the type adapted to be operated by a source of suction comprising in combination, a sector-shaped casing, a shaft axially disposed with respect to said casing and carrying at one end the windshield-wiper, a piston keyed on said shaft and adapted to receive a reciprocating rotary motion within said casing, a slide-valve rotatably mounted on said shaft for operatively connecting said source of suction to opposite sides of the piston alternately, two lugs on said slide-valve, a cam rotatably mounted on said shaft, two lugs on said cam adapted to cooperate with the lugs of the slide-valve, a casing adapted to inclose the slide-valve and the cam, a coil spring mounted in this casing with its axis parallel to the shaft, the two ends of said spring projecting radially so that the lower end is in contact with the bottom of the casing and the upper end bears against the cam, a catch on said cam, a pin projecting radially from the shaft and adapted to engage said cam for rotating the cam so as to compress said spring and then release it whereby said spring imparts a sudden impulse to the cam, said cam being provided with notches close to the lugs adapted to receive the upper end of the spring so as to limit the sudden motion of the cam, a plate slidably mounted on the bottom of the last mentioned casing, a knob fixed on said plate and projecting outside from the casing for actuating said plate, and a tongue on said plate adapted to engage the upper end of the spring so as to keep it out of contact with the cam, whereby the source of suction remains in communication with the same side of the piston.

6. A windshield-wiper motor of the type adapted to be operated by a source of suction; comprising in combination, a sector-shaped casing, a shaft axially disposed with respect to said casing and carrying at one end the windshield-wiper, a piston keyed to said shaft and adapted to receive a reciprocating rotary motion within said casing, a slide-valve rotatably mounted on said shaft for operatively connecting said source of suction to opposite sides of the piston alternately, said slide-valve being provided with a plurality of chambers for connecting each side of the piston alternately with the atmosphere, means for braking the ingress of air into said chambers, a snap action mechanism adapted to impart sudden impulses to said slide-valve, means actuated from the shaft for operating said snap action mechanism and means operated from the outside for putting said snap action mechanism out of operation so as to stop the windshield-engine.

7. A windshield-wiper motor of the type adapted to be operated by a source of suction comprising in combination, a sector-shaped casing, a shaft axially disposed with respect to said casing and carrying at one end the windshield-wiper, a piston keyed to said shaft and adapted to receive a reciprocating rotary motion within said casing, a slide rotatably mounted on said shaft for operatively connecting said source of suction to opposite sides of the piston alternately, said slide valve being provided with chambers having a plurality of restricted passages for connecting each side of the piston alternately with the atmosphere and braking the ingress of air into said chambers, a snap action mechanism adapted to impart sudden impulses to said slide-valve, means actuated from the shaft for operating said snap action mechanism and means operated from the outside for putting said snap action mechanism out of operation so as to stop the windshield-wiper engine.

8. A windshield-wiper motor of the type adapted to be operated by a source of suction comprising in combination, a sector-shaped casing, a shaft axially disposed with respect to said casing and carrying at one end the windshield-wiper, a piston keyed to said shaft and adapted to receive a reciprocating rotary motion within said casing, a slide-valve rotatably mounted on said shaft for operatively connecting said source of suction to opposite sides of the piston alternately, said slide-valve being provided with chambers for connecting each side of the piston alternately with the atmosphere, baffled passages for braking the ingress of air into said chambers, a snap action mechanism adapted to impart sudden impulses to said slide-valve, means actuated from the shaft for operating said snap action mechanism and means operated from the outside for putting said snap action mechanism out of operation so as to stop the windshield-wiper engine.

In testimony whereof I have signed this specification.

EMILE BRUMM.